US009378652B2

(12) United States Patent
Forrest

(10) Patent No.: US 9,378,652 B2
(45) Date of Patent: *Jun. 28, 2016

(54) MUSICAL LEARNING AND INTERACTION THROUGH SHAPES

(71) Applicant: David Forrest, Topanga, CA (US)

(72) Inventor: David Forrest, Topanga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,707

(22) Filed: Aug. 21, 2015

(65) Prior Publication Data

US 2015/0364054 A1   Dec. 17, 2015

Related U.S. Application Data

(63) Continuation of application No. 13/963,173, filed on Aug. 9, 2013, now Pat. No. 9,147,386, which is a continuation-in-part of application No. 13/416,825, filed on Mar. 9, 2012, now Pat. No. 8,716,583.

(60) Provisional application No. 61/452,658, filed on Mar. 15, 2011.

(51) Int. Cl.
| | |
|---|---|
| *G09B 15/02* | (2006.01) |
| *G09B 15/00* | (2006.01) |
| *G10H 1/18* | (2006.01) |
| *G10H 1/36* | (2006.01) |
| *G10H 1/00* | (2006.01) |

(52) U.S. Cl.
CPC ............ *G09B 15/002* (2013.01); *G09B 15/023* (2013.01); *G10H 1/0016* (2013.01); *G10H 1/18* (2013.01); *G10H 1/368* (2013.01); *G10H 2220/005* (2013.01); *G10H 2220/026* (2013.01); *G10H 2220/041* (2013.01); *G10H 2220/091* (2013.01); *G10H 2220/241* (2013.01)

(58) Field of Classification Search
CPC .............................. G09B 15/02; G09B 15/023
USPC .................................. 84/600–602, 47, 470 R
See application file for complete search history.

(56) References Cited

U.S. PATENT DOCUMENTS

| | | | |
|---|---|---|---|
| 1,053,366 | A | 2/1913 | Dickson |
| 3,208,327 | A | 9/1965 | Allen |
| 3,837,256 | A | 9/1974 | Gullickson |
| 4,331,062 | A | 5/1982 | Rogers |
| 4,480,521 | A | 11/1984 | Schmoyer |
| 4,538,501 | A | 9/1985 | Smith |
| 4,539,882 | A | 9/1985 | Yuzawa |

(Continued)

OTHER PUBLICATIONS

U.S. Appl. No. 13/963,173, Sep. 22, 2014, Office Action.

(Continued)

*Primary Examiner* — David Warren
(74) *Attorney, Agent, or Firm* — Workman Nydegger

(57) ABSTRACT

The present invention extends to methods, systems, and computer program products for musical learning and interaction. Embodiments include presenting a playable portion of a musical instrument at a user interface. The user interface includes a video layer. The video layer is configured to visually present one or more frames of video. The user interface also includes a virtual musical instrument or a playable portion of the virtual musical instrument. At least the playable portion of the virtual musical instrument is overlaid over a least a portion of the video layer, and is at least partially transparent. As such, the portion of the video layer over which the playable portion of the virtual musical instrument is overlaid shows through the virtual musical instrument.

20 Claims, 14 Drawing Sheets

(56) References Cited

U.S. PATENT DOCUMENTS

| | | | |
|---|---|---|---|
| 5,052,265 A | 10/1991 | Henry | |
| 5,174,759 A | 12/1992 | Preston | |
| 5,391,828 A | 2/1995 | Tajima | |
| 5,464,946 A * | 11/1995 | Lewis | G09B 15/00 84/477 R |
| 5,535,421 A | 7/1996 | Weinreich | |
| 5,544,562 A | 8/1996 | Jeon | |
| 5,559,299 A | 9/1996 | Tajima | |
| 5,636,276 A * | 6/1997 | Brugger | G10H 1/0033 348/E7.061 |
| 5,886,273 A | 3/1999 | Haruyama | |
| 6,072,933 A * | 6/2000 | Green | G10H 1/368 386/278 |
| 6,087,577 A | 7/2000 | Yahata | |
| 6,328,570 B1 * | 12/2001 | Ng | G09B 5/065 434/307 A |
| 6,388,181 B2 | 5/2002 | Moe | |
| 6,566,593 B2 | 5/2003 | Pertchik | |
| 6,582,235 B1 | 6/2003 | Tsai | |
| 6,821,203 B2 | 11/2004 | Suga | |
| 6,982,375 B2 | 1/2006 | McGregor | |
| 7,453,035 B1 | 11/2008 | Evans | |
| 7,612,278 B2 * | 11/2009 | Sitrick | G09B 15/002 84/609 |
| 7,705,231 B2 | 4/2010 | Morris | |
| 7,772,480 B2 | 8/2010 | Brennan | |
| 7,829,778 B2 | 11/2010 | Gatzsche | |
| 7,893,337 B2 | 2/2011 | Lenz | |
| 8,008,562 B2 | 8/2011 | Ikeda | |
| 8,015,200 B2 * | 9/2011 | Seiflein | G06F 21/10 369/1 |
| 8,015,507 B2 * | 9/2011 | Madsen | G10H 1/0025 715/768 |
| 8,058,542 B2 | 11/2011 | Schwartz | |
| 8,224,696 B2 * | 7/2012 | Speiser | G06Q 30/0212 705/14.16 |
| 8,338,684 B2 | 12/2012 | Pillhofer | |
| 8,347,210 B2 * | 1/2013 | Ubillos | G06F 3/0486 715/716 |
| 8,378,194 B2 | 2/2013 | Daisy | |
| 8,445,767 B2 | 5/2013 | Brow | |
| 8,522,301 B2 * | 8/2013 | Zalewski | G09B 5/06 386/248 |
| 8,716,583 B2 | 5/2014 | Forrest | |
| 2001/0029829 A1 | 10/2001 | Moe | |
| 2002/0177113 A1 | 11/2002 | Sherlock | |
| 2003/0100965 A1 * | 5/2003 | Sitrick | G09B 15/023 700/83 |
| 2004/0118268 A1 * | 6/2004 | Ludwig | G10H 1/00 84/645 |
| 2004/0244564 A1 | 12/2004 | McGregor | |
| 2005/0217462 A1 * | 10/2005 | Thomson | G10H 1/368 84/612 |
| 2006/0130635 A1 | 6/2006 | Rubang | |
| 2006/0137512 A1 | 6/2006 | Lassar | |
| 2006/0181537 A1 * | 8/2006 | Vasan | G06T 13/20 345/473 |
| 2006/0288842 A1 * | 12/2006 | Sitrick | G09B 15/002 84/477 R |
| 2007/0089590 A1 | 4/2007 | Katou | |
| 2007/0256540 A1 | 11/2007 | Salter | |
| 2008/0127810 A1 | 6/2008 | Egan | |
| 2008/0295670 A9 | 12/2008 | Egan | |
| 2009/0100092 A1 * | 4/2009 | Seiflein | G06F 21/10 |
| 2009/0173212 A1 | 7/2009 | Wold | |
| 2010/0080532 A1 * | 4/2010 | Ubillos | G06F 3/0486 386/241 |
| 2010/0184497 A1 | 7/2010 | Cichowlas | |
| 2010/0236381 A1 | 9/2010 | Ikeda | |
| 2010/0257993 A1 | 10/2010 | Brow | |
| 2011/0003638 A1 * | 1/2011 | Lee | G09B 15/00 463/35 |
| 2011/0023688 A1 | 2/2011 | Daisy | |
| 2011/0316793 A1 * | 12/2011 | Fushiki | G06F 3/04886 345/173 |
| 2012/0071238 A1 * | 3/2012 | Bala | A63F 13/10 463/31 |
| 2012/0234159 A1 | 9/2012 | Forrest | |
| 2012/0269357 A1 * | 10/2012 | Henderson | G10H 1/0066 381/61 |
| 2013/0000463 A1 | 1/2013 | Grover | |
| 2013/0065656 A1 * | 3/2013 | Parks | A63F 13/10 463/7 |
| 2013/0106689 A1 * | 5/2013 | Salsman | G06F 3/005 345/156 |
| 2013/0133506 A1 | 5/2013 | Daisy | |
| 2013/0157761 A1 | 6/2013 | Cichowlas | |
| 2013/0233152 A1 | 9/2013 | Pillhofer | |
| 2013/0319208 A1 * | 12/2013 | Forrest | G09B 15/002 84/478 |
| 2014/0100010 A1 * | 4/2014 | Lee | G09B 15/00 463/7 |

OTHER PUBLICATIONS

U.S. Appl. No. 13/963,173, May 22, 2015, Notice of Allowance.

* cited by examiner

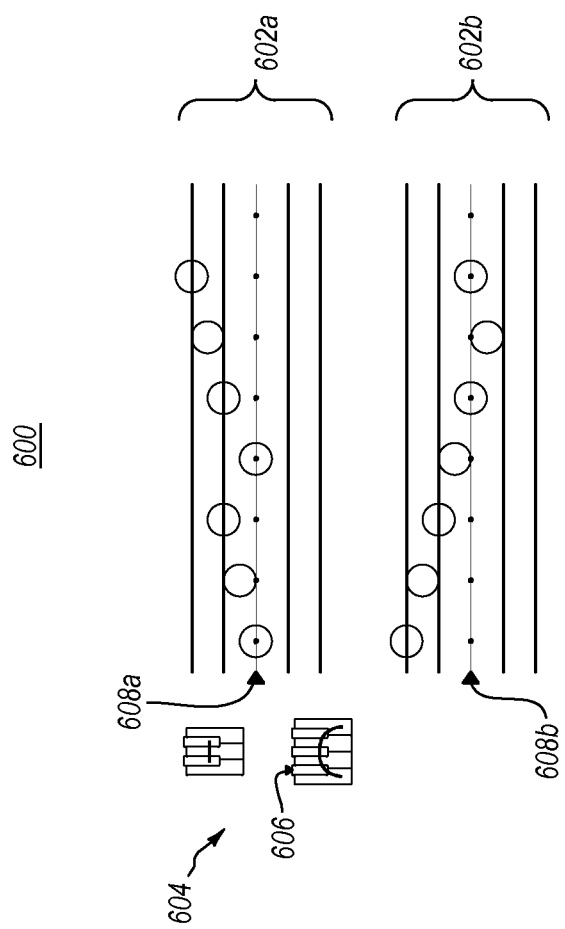

700a

700b

MUSICAL LEARNING AND INTERACTION THROUGH SHAPES

CROSS-REFERENCE TO RELATED APPLICATIONS

This application is a continuation of, and claims priority to U.S. patent application Ser. No. 13/963,173, filed Aug. 9, 2013, entitled "MUSICAL LEARNING AND INTERACTION THROUGH SHAPES", which is a continuation-in-part of, and claims priority to U.S. patent application Ser. No. 13/416,825, filed on Mar. 9, 2012, now issued U.S. Pat. No. 8,716,583, entitled "MUSICAL LEARNING AND INTERACTION THROUGH SHAPES", which claims priority to and the benefit of, U.S. Patent Application Ser. No. 61/452,658, filed on Mar. 15, 2011, entitled "SYSTEMS, METHODS, AND DEVICES FOR LEARNING AND PLAYING MUSIC". The entire contents of the foregoing are hereby expressly incorporated herein by this reference in their entirety.

BACKGROUND

Conventional musical education typically begins by teaching a student a musical notation system. Musical notation systems communicate information about the notes that make up a musical piece, and enable a performer to produce the musical piece on a musical instrument. For example, in Western society, most students learn the five-line staff notation, in which pitch is represented by placement of notes (along with accidentals, such as sharps, flats, and naturals) on the staff and duration is represented with different note values (along with additional symbols such as dots and ties). Additionally, a musical notation system may comprise various other musical symbols (such as chord names, written or unwritten), which indicate the notes to produce.

Concurrent with learning a notation system, students learn how that notation system maps to the instrument being learned. After much practice, many students learn to play musical pieces on the instrument when presented with notations representing the musical pieces. For example, students may learn how to map the staff notation to a musical keyboard, such as on a piano. Some students can become adept at memorizing musical pieces, and a small number of students become musically fluent and are able to write music, modify musical pieces, improvise during performance, "play by ear," and the like.

While conventional musical education does enable many students to learn notation systems and instruments, conventional musical education can be insufficient for a large proportion of students. For example, most students are taught within a limited tonal framework and on a subset of an instrument in the early stages of their education. Furthermore, most students are encouraged to adhere rigidly to written notes, and to exercise their ability to play those written notes. As such, students may become limited in their ability to understand musical concepts aurally, and to play music that interests them during the early stages of their education, which often leads to frustration, disinterest, and cessation of music study. Furthermore, even when students gain some mastery of a simplified system, those students may have difficulty moving on to a more complete system and to full use of a musical instrument.

Conventional musical education also encourages visual orientation to both the notation system and the instrument being played (e.g., to follow written notes and/or to look at the instrument during play). As such, while students may be able to reproduce music from a written notation system, those students may become limited in their ability to navigate the instrument through their tactile senses, which in turn limits their ability to read music fluently at sight, and/or to develop an instinctive technique on the instrument.

BRIEF SUMMARY

The present invention extends to methods, systems, and computer program products for musical learning and interaction through shapes. Shapes are a system for enabling musical interaction and refining musical awareness that enables students to quickly organize, remember, and interact with the broadest tonal contexts in music, as defined by implicit (i.e., naturally acquired) tonal knowledge. A shape is a device for representing the tonal context of a musical selection without reference to a tonal center, and without implied reference to any other tonal context. Shapes thereby enable users to interact directly with a song or musical selection, at the most readily perceptible level of tonal context, and without regard, at first, to standard musical notation (e.g., names or symbols).

In some embodiments, a method for presenting a music lesson includes presenting one or more key groupings (shapes) at a display device. Each key grouping represents a group of notes that are within the same tonal context. Presenting the key groupings includes presenting a particular key grouping that has a tonal context that fits with a particular song, and audibly playing the particular song. A user is prompted to provide user input at an input device while the particular song is being played. In particular, the user is prompted to enter one or more keys selected from the particular key grouping, in any order. The user input is received at the input device.

In other embodiments, a method for composing and/or remixing music includes identifying one or more key groupings (shapes) that have a tonal context that fits with a particular song or musical selection. Each key grouping represents a group of notes that are within the same tonal context. A user is prompted to provide user input at an input device concurrent with the playing of the particular song, and to enter the user input using one or more keys selected from the one or more key groupings, in any order. One or more tracks of the particular song are audibly played, and at least one track of audio input is recorded based on user input received at the input device. The recorded track(s) of audio input are remixed with the played track(s) of the particular song.

Other embodiments include a musical instrument. The musical instrument includes a keyboard which has a first end, a second opposing end, and an axis of symmetry disposed generally halfway between the first and second ends. The musical instrument also includes a plurality of top keys and a plurality of bottom keys that are pressable to produce musical notes and that are positioned on the keyboard between the first and second ends. The top and bottom keys are centered about the axis of symmetry, such that the top and bottom keys that are positioned between the axis of symmetry and the first end are symmetrical with the top and bottom keys that are positioned between the axis of symmetry and the second end.

Further embodiments include presenting a musical instrument at a user interface. The user interface includes a video layer. The video layer is configured to visually present one or more frames of video. The user interface also includes a virtual musical instrument. The virtual musical instrument is overlaid over at least a portion of the video layer, and is at least partially transparent. As such, the portion of the video layer over which the virtual musical instrument is overlaid shows through the virtual musical instrument.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates an example shape notation.

DETAILED DESCRIPTION

Figure 1A:
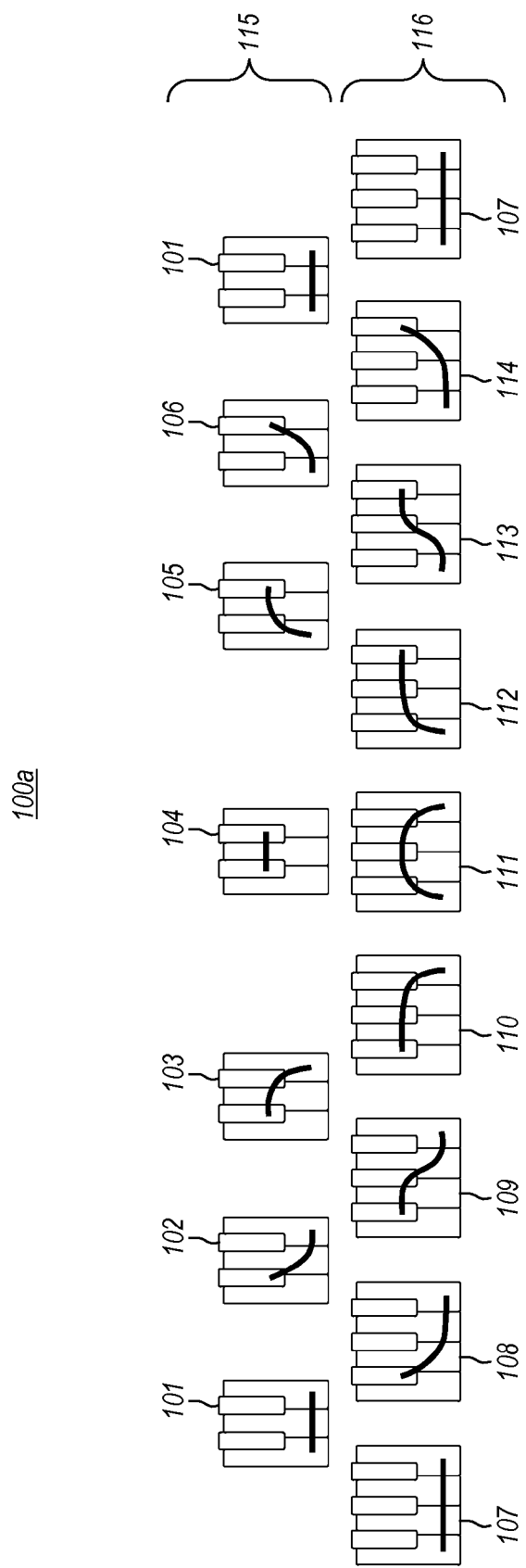
FIG. 1A illustrates one example of a shape layout that is embodied on keys of a musical keyboard.

The present invention extends to methods, systems, and computer program products for musical learning and interaction through shapes. Shapes are a system for enabling musical interaction and refining musical awareness that enables students to quickly organize, remember, and interact with the broadest tonal contexts in music, as defined by implicit (i.e., naturally acquired) tonal knowledge. A shape is a device for representing the tonal context of a musical selection without reference to a tonal center, and without implied reference to any other tonal context. Shapes thereby enable users to interact directly with a song or musical selection, at the most readily perceptible level of tonal context, and without regard, at first, to standard musical notation (e.g., names or symbols).

In some embodiments, a method for presenting a music lesson includes presenting one or more key groupings (shapes) at a display device. Each key grouping represents a group of notes that are within the same tonal context. Presenting the key groupings includes presenting a particular key grouping that has a tonal context that fits with a particular song, and audibly playing the particular song. A user is prompted to provide user input at an input device while the particular song is being played. In particular, the user is prompted to enter one or more keys selected from the particular key grouping, in any order. The user input is received at the input device.

In other embodiments, a method for composing and/or remixing music includes identifying one or more key groupings (shapes) that have a tonal context that fits with a particular song or musical selection. Each key grouping represents a group of notes that are within the same tonal context. A user is prompted to provide user input at an input device concurrent with the playing of the particular song, and to enter the user input using one or more keys selected from the one or more key groupings, in any order. One or more tracks of the particular song are audibly played, and at least one track of audio input is recorded based on user input received at the input device. The recorded track(s) of audio input are remixed with the played track(s) of the particular song.

Other embodiments include a musical instrument. The musical instrument includes a keyboard which has a first end, a second opposing end, and an axis of symmetry disposed generally halfway between the first and second ends. The musical instrument also includes a plurality of top keys and a plurality of bottom keys that are pressable to produce musical notes and that are positioned on the keyboard between the first and second ends. The top and bottom keys are centered about the axis of symmetry, such that the top and bottom keys that are positioned between the axis of symmetry and the first end are symmetrical with the top and bottom keys that are positioned between the axis of symmetry and the second end.

Further embodiments include presenting a musical instrument at a user interface. The user interface includes a video layer. The video layer is configured to visually present one or more frames of video. The user interface also includes a virtual musical instrument. The virtual musical instrument is overlaid over a least a portion of the video layer, and is at least partially transparent. As such, the portion of the video layer over which the virtual musical instrument is overlaid shows through the virtual musical instrument.

Embodiments described herein enable students to interact with music through a novel education device referred to herein as "shapes." Shapes enable students to use an instrument to begin interacting with a song's broader tonal context, without regard for changing chords or scales, and without regard for any names or symbols. As such, with very little instruction, shapes enable students to interact with virtually any song using implicit (i.e., naturally acquired) tonal knowledge, irrespective of prior formal music training. Thus, even without knowledge of complex notation systems, shapes enable students to play along with songs, to remix songs, and to otherwise engage with and create music. Shapes help to hold students' interest in musical education by enabling them to interact with music that they are familiar with and enjoy. At the same time, shapes encourage students to develop musical intuition and to develop tactile familiarity with an instrument.

Shapes represent the tonal context of a musical selection in a manner that directly maps to a musical instrument. Shapes does so without reference to any other tonal context (as distinguished from a key signature) and without reference to a tonal center (as distinguished from any type of scale). In other words, shapes convey information about tonal context directly on an instrument, thereby linking the tonal context with the tactile experience of playing the instrument. Shapes do not indicate any specific musical structure, type of musical structure, or sequence of musical pitches (as distinguished from any type of chord symbol or tablature). In some embodiments, shapes organize tonal contexts into an easy-to-remember mnemonic that provides descriptive names relative to a particular instrument, rather than theoretical names. In some embodiments, shapes mnemonics provide a symmetrical system of "strokes" that can be expressed without a name.

For ease in description, the disclosure herein is described within the context of the musical keyboard, such as is found on a piano. However, the general principles of shapes are applicable to a broad range of musical instruments (both physical and virtual). Accordingly, the present invention is not limited to pianos, piano-like instruments, or keyboards. In fact, the present invention is not limited to existing instruments, and can extend to instruments yet to be invented.

FIG. 1A illustrates one example of a shape layout 100a that is embodied on keys of a musical keyboard. Layout 100a includes groups of notes that form different "shapes" on the keyboard. Layout 100a includes fourteen shapes (shapes 101-114), with shapes 101 and 107 repeated at opposing sides of the layout for symmetry. Layout 100a organizes the shapes into top row 115 comprising shapes 101-106 and bottom row 116 comprising shapes 107-114. Each shape may be viewed as being made of lines, drawn on the keyboard, that connect several keys (top and/or bottom) that are a part of the shape into a single recognizable "stroke."

Shapes are structured so that musical selections fit with a pair of adjacent shapes, one selected from top row 115 and one selected from bottom row 116. Pairs may be named according to the number of top keys they contain and the direction of these keys within the pair. For example, the pair comprising shapes 112 and 105 may be called "five right," the pair comprising shapes 113 and 105 may be called "four right," the pair comprising shapes 113 and 106 may be called "three right," the pair comprising shapes 114 and 106 may be called "two right," and the pair comprising shapes 114 and 107 may be called "one right." Similarly, the pair comprising shapes 110 and 103 may be called "five left," the pair comprising shapes 109 and 103 may be called "four left," the pair comprising shapes 109 and 102 may be called "three left," the pair comprising shapes 108 and 102 may be called "two left," and the pair comprising shapes 108 and 101 may be called "one left." The pair comprising shapes 111 and 104 may be called the "top" shape, since it includes all the top keys, and is centered on these keys. The pair comprising shapes 101 and 107 may be called the "bottom" shape, since it includes all the bottom keys. When grouped together (e.g., under a single name), the term "shape" may therefore refer to both shapes in a pair.

Figure 1B:
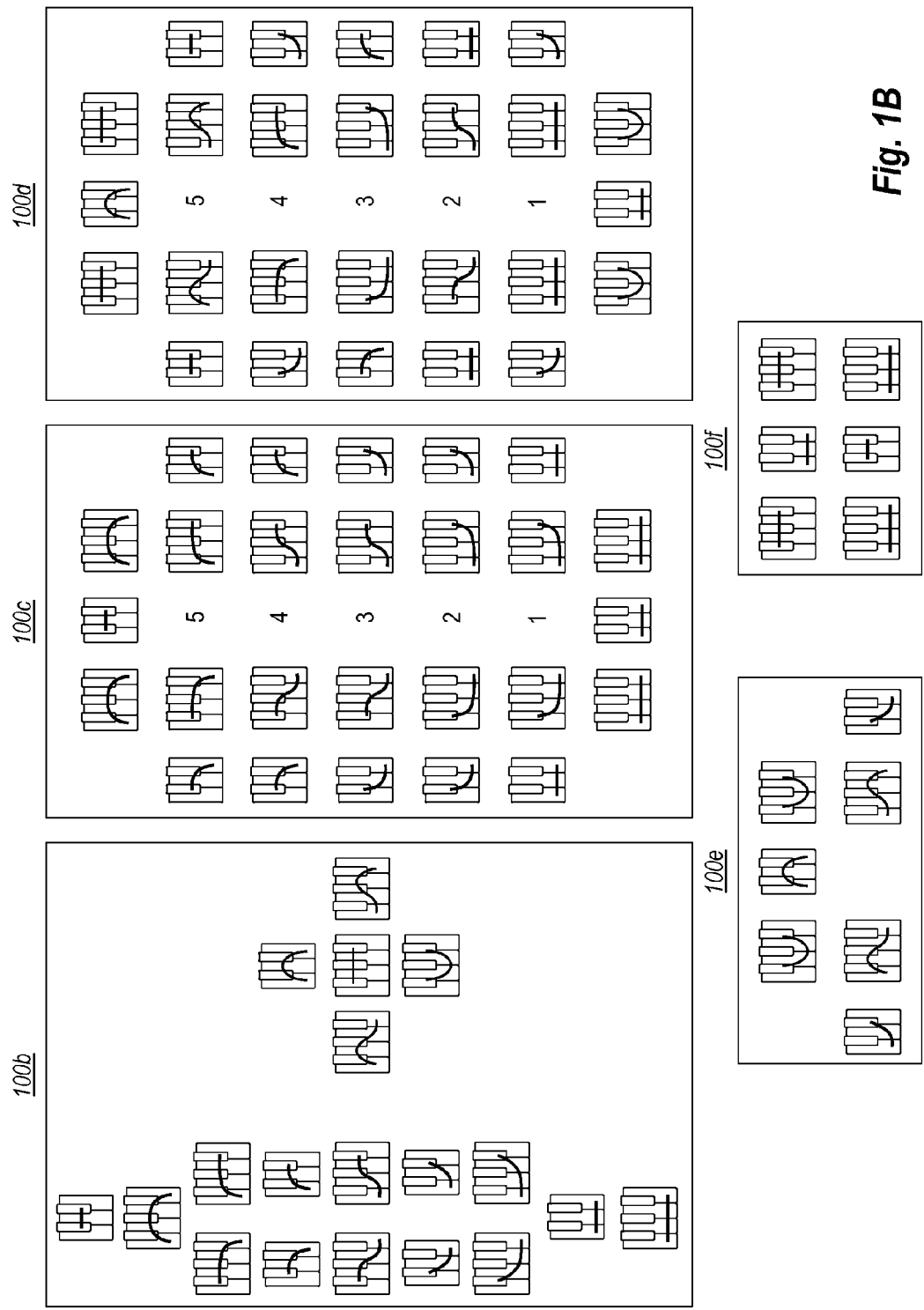
FIG. 1B illustrates other examples of shape layouts that are embodied on keys of a musical keyboard.

Shapes may be organized into four groups based on their sound and structure. The first group of shapes is the most common, and can be arranged in different layouts depending on the application. Layout 100a, for example, presents one approach to a shape layout. FIG. 1B illustrates some alternate shape layouts. Layout 100b illustrates a compact layout, which arranges the shapes vertically and emphasizes the symmetry of each shape and its opposite. The five additional shapes that are arranged in a "plus sign" configuration are used in the second, third, and fourth groups of shapes.

Layout 100c is made up of the first group of shapes and layout 100d is made up of the second group of shapes. In these layouts, the "top" and "bottom" shapes are located at the top and the bottom of each layout, and the "left" and "right" shapes are on either side of their corresponding numbers. Layouts 100e and 100f are made up of the third and fourth groups of shapes.

Figure 2A:
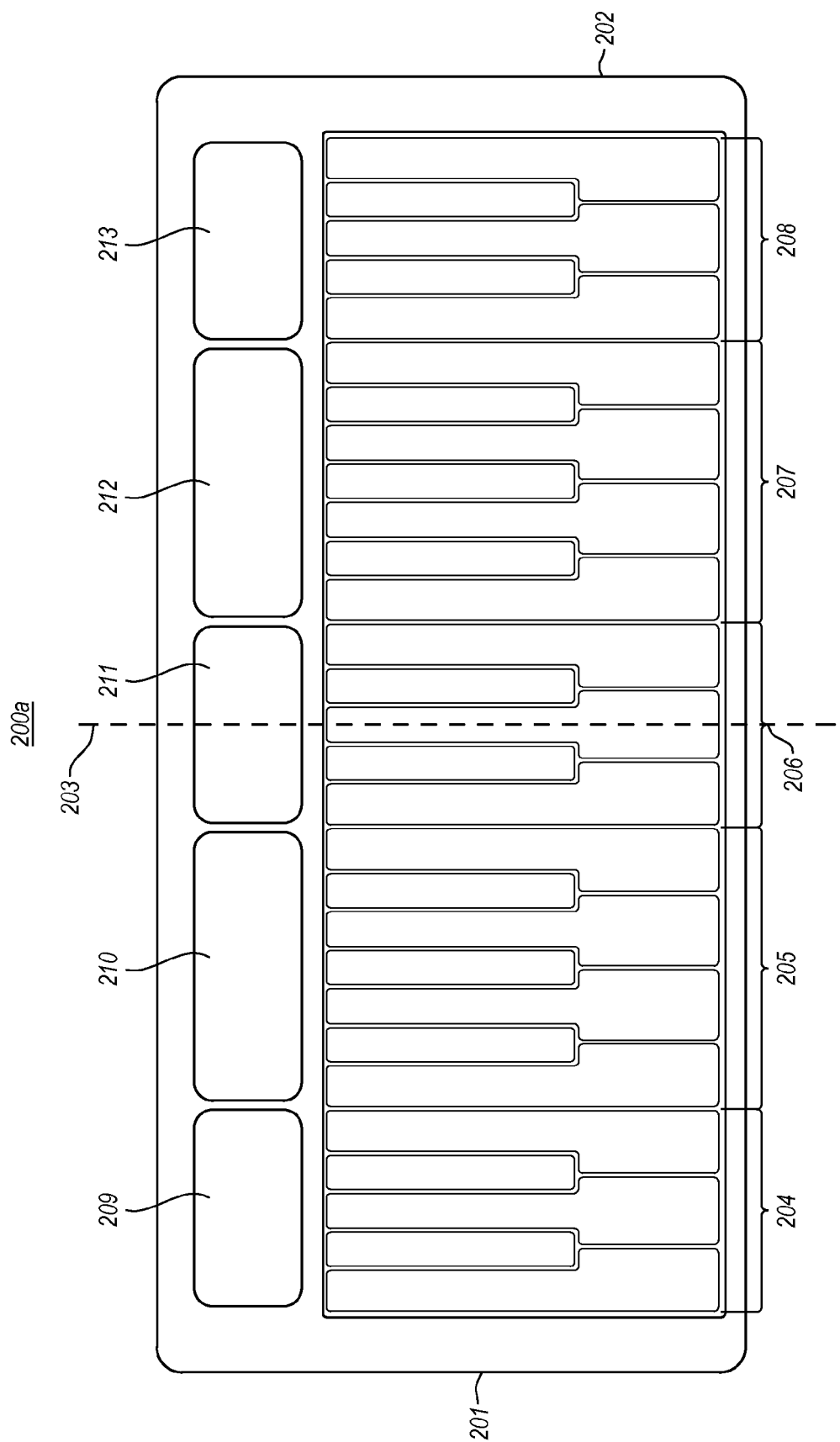
FIG. 2A illustrates one example of a centered keyboard musical instrument.

In some embodiments, the foregoing shape layouts can be utilized in connection with a centered keyboard. FIG. 2A illustrates one embodiment of a centered keyboard 200a. Centered keyboard 200a provides a symmetrical "compass," which is centered on the instrument. Centered keyboard 200a provides symmetrical groups of top and bottom keys that match the contour of human hands and that encourage tactile senses. Centered keyboard 200a de-emphasizes conventional C-Major centrism and visual orientation, and encourages a stable and absolute tactile reference.

As depicted, centered keyboard 200a includes first end 201, opposing second end 202, and axis of symmetry 203 that is disposed generally halfway therebetween. Centered keyboard 200a also includes a plurality of top keys and a plurality of bottom keys positioned on the keyboard between the first and second ends. Each key is pressable to produce musical notes. While centered keyboard 200a can include any number of key groupings, the depicted example includes five key groupings, including key groupings 204, 206, and 208 that each include two top keys and three bottom keys and key groupings 205 and 207 that each include three top keys and four bottom keys. The depicted key groupings are arranged about axis of symmetry 203, such that the top and bottom keys positioned between axis of symmetry 203 and first end 201 are symmetrical with the top and bottom keys positioned between axis of symmetry 203 and second end 202.

Emphasizing axis of symmetry 203 creates a balanced relationship between the instrument and human hands, arms, and bodies—which are also symmetrical. Emphasizing axis of symmetry 203 provides a physical center point to develop absolute tactile sense while playing centered keyboard 200a. Emphasizing axis of symmetry 203 also provides a common point of reference for the varying compasses of different instruments.

In some embodiments, all the keys of centered keyboard 200a are of the same color (e.g., white), as opposed to conventional keyboard instruments which have keys of differing colors (e.g., black for the top keys and white for the bottom keys). Conventional keyboard instruments use different colors to enhance their pattern visually, which emphasizes a primary tonality of "no sharps, no flats." In contrast, by using keys of the same color, centered keyboard 200a emphasizes tactile instead of visual orientation and avoids implying any musical difference between the top keys and the bottom keys. As such, students are encouraged to use the top keys, as opposed to conventional methods, which may lead some students to avoid the top keys.

In some embodiments, centered keyboard 200a includes a plurality of additional control regions, or "beat pads." As depicted, for example, centered keyboard 200a includes beat pads 209-213. In the depicted embodiment, the beat pads are arranged to match key groupings. For example, beat pads 209, 211, and 213 are positioned over key groupings 204, 206, and 208, respectively. Similarly, beat pads 210 and 212 are positioned over key groupings 205 and 207, respectively. In some embodiments, any beat pads are symmetrical about axis of symmetry 203.

In some embodiments, centered keyboard 200a may include a depiction of one or more shape mnemonics. For example, centered keyboard 200a may include a visual indication of shape layout 100a. In some embodiments, a visual indication of one or more shapes may also be overlaid on the playable keys themselves.

Figure 2B:
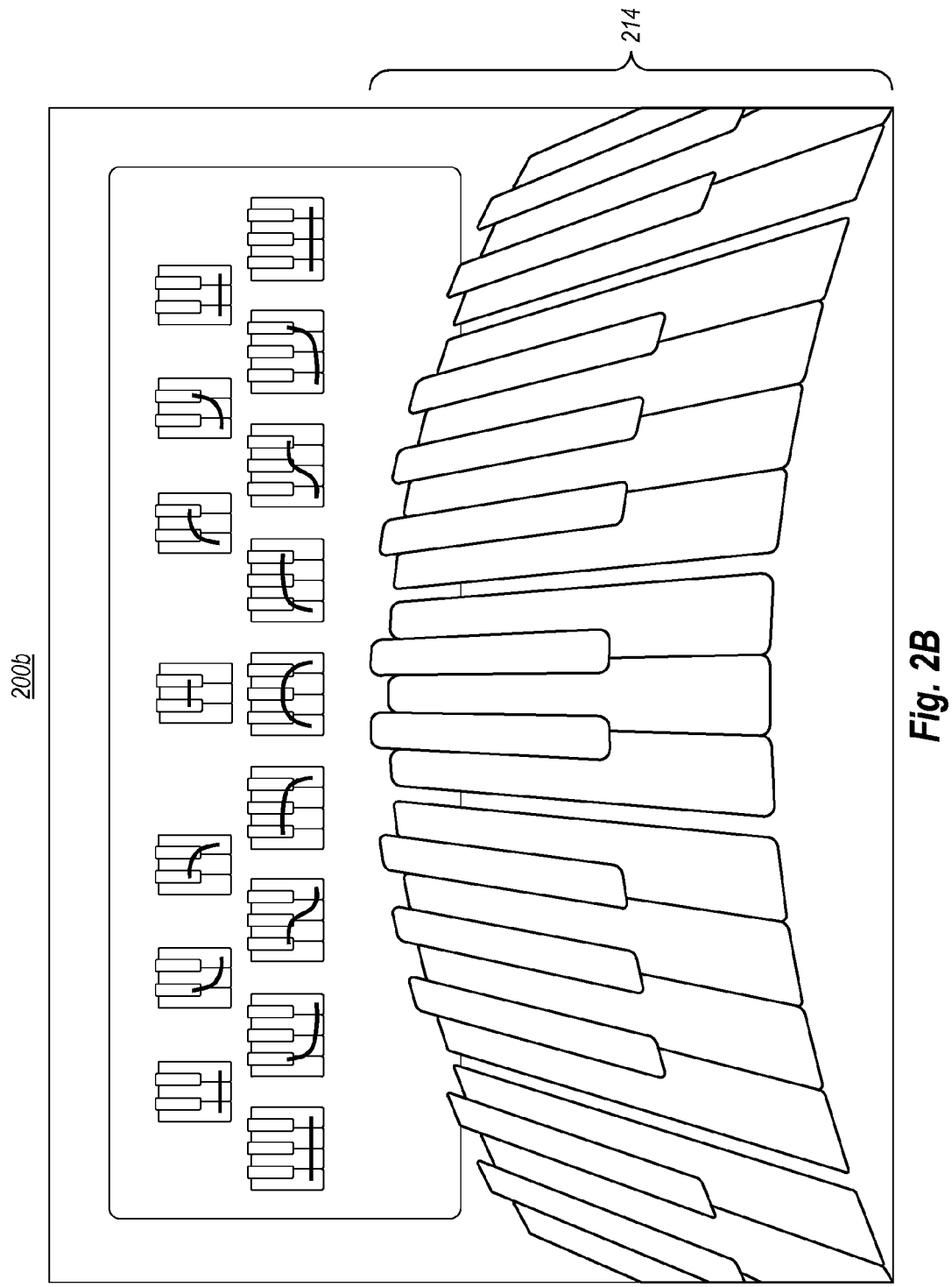
FIG. 2B illustrates one example of a virtual centered keyboard musical instrument and user interface.

In some embodiments, centered keyboard 200a comprises a physical device. Other embodiments may comprise a virtual device which is displayed at a computer display device. For example FIG. 2B illustrates a user interface 200b including centered keyboard 214, which is a virtual keyboard displayed at a display device, such as the display of a mobile computing device (e.g., a tablet computer). Any of the foregoing description of centered keyboard 200a is equally applicable to centered keyboard 214. In some embodiments, such as the depicted embodiment, centered keyboard 214 may comprise a curved layout to provide enhanced user interface ergonomics, and to present a greater number of keys than may be comfortably sized with a conventional straight layout. In the depicted embodiment, shape layout 100a is visually presented along with centered keyboard 214.

Figure 2C:
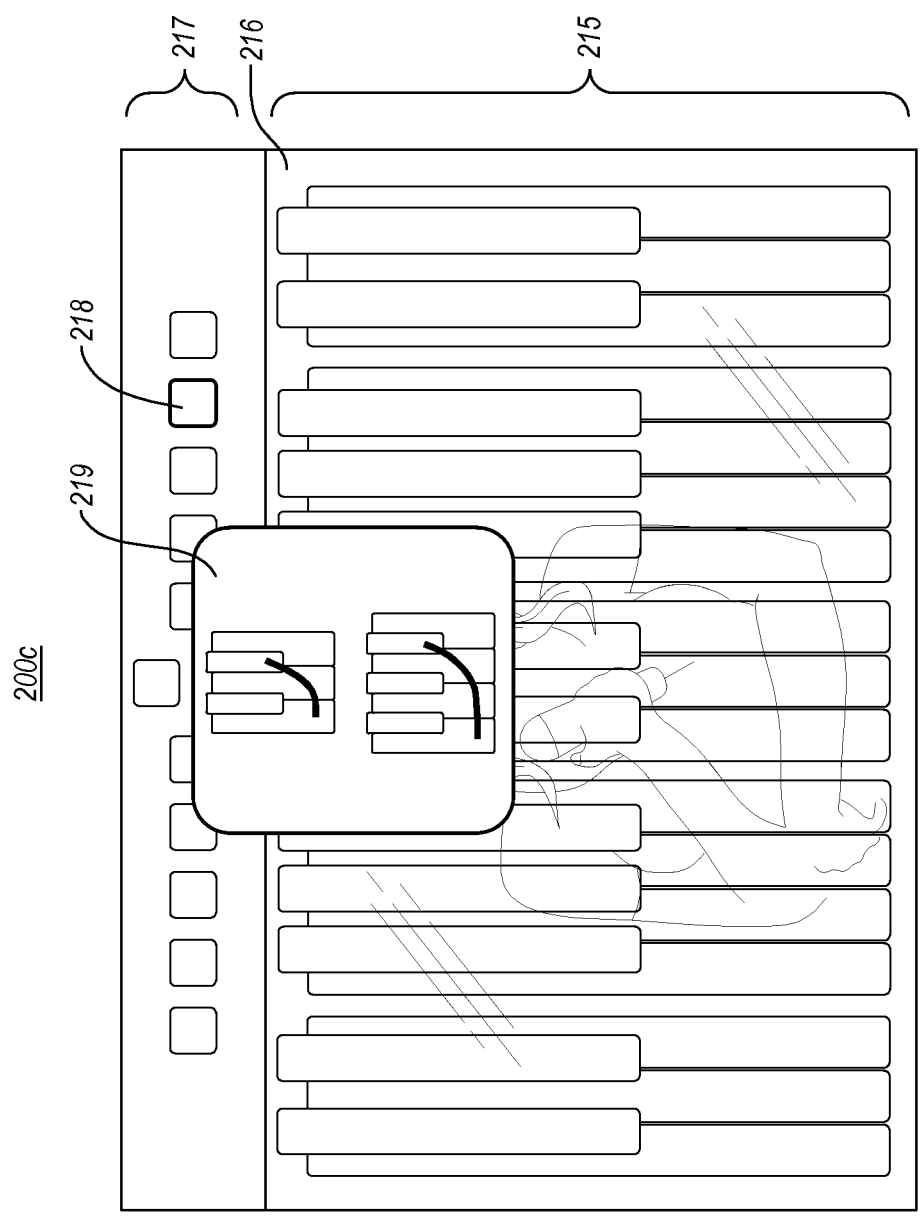
FIG. 2C illustrates one example of a virtual centered keyboard musical instrument and user interface.
Figure 8A:
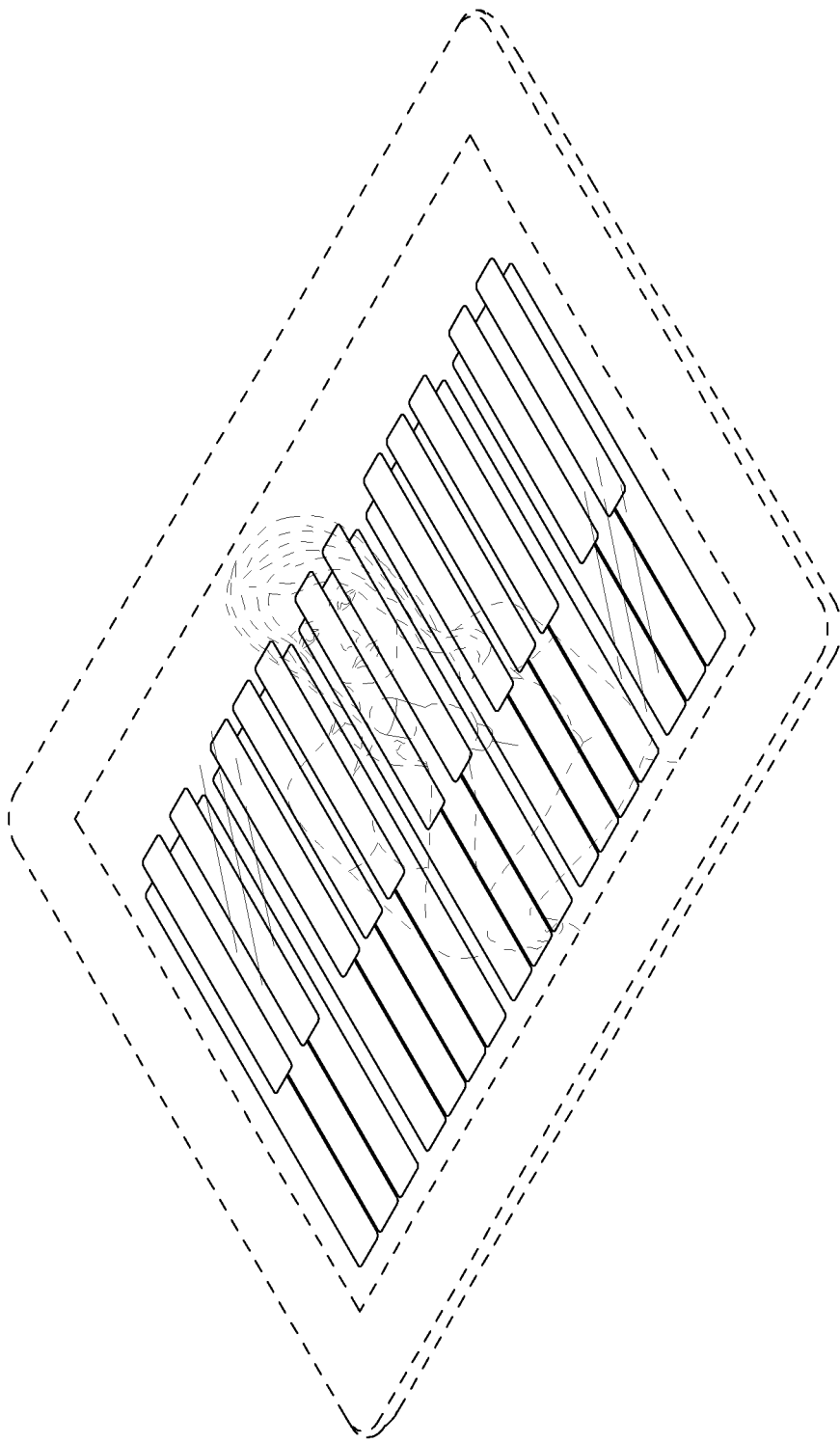
FIG. 8A illustrates a front perspective view of a user interface for a virtual centered keyboard musical instrument.
Figure 8B:
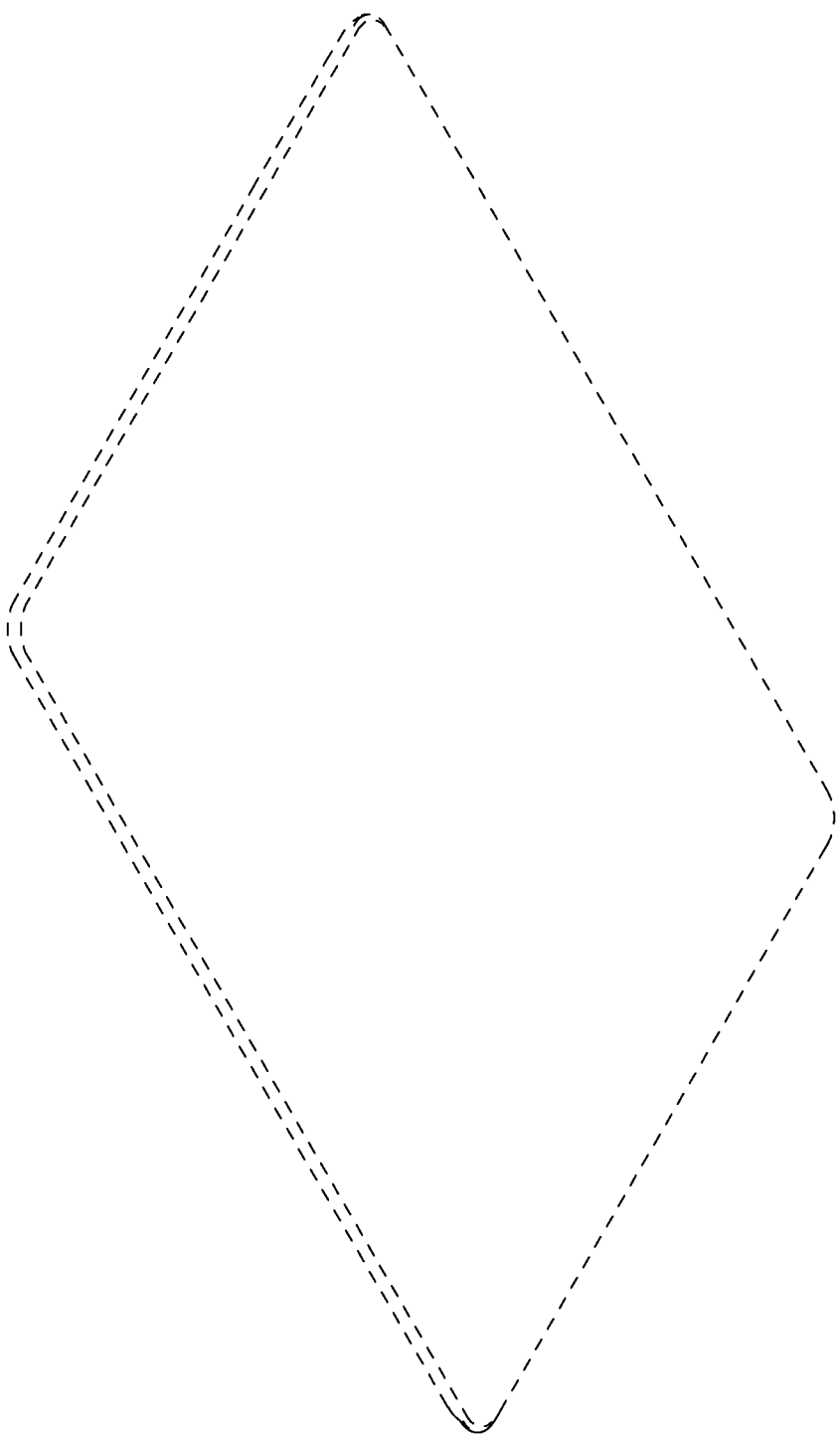
FIG. 8B illustrates a rear perspective view of a user interface for a virtual centered keyboard musical instrument.
Figure 8C:
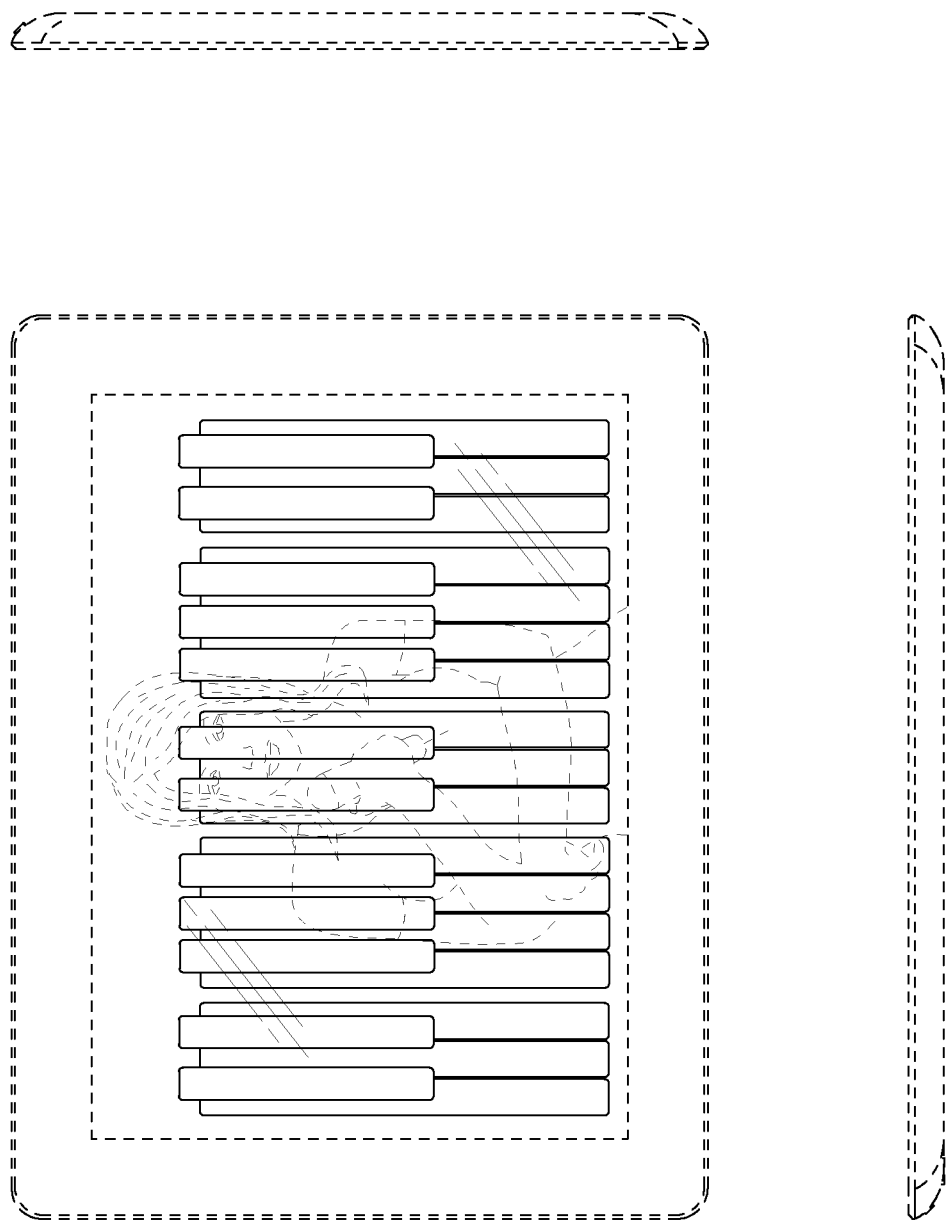
FIG. 8C illustrates plan and side views of a user interface for a virtual centered keyboard musical instrument.

In another embodiment, FIG. 2C illustrates a user interface 200c including centered keyboard 215, which is a virtual keyboard displayed at a display device, such as the display of a mobile computing device (e.g., a tablet computer). Any of the foregoing description of centered keyboard 200a is equally applicable to centered keyboard 215. In user interface 200c, centered keyboard 215 is presented in a translucent or partially transparent manner, in which centered keyboard 215 is overlaid on top of a video layer 216. For example, centered keyboard 215 may be overlaid on top of a music video. Overlaying centered keyboard 215 on top of a music video enables a user to see and play along with the music video, while concurrently seeing the keys of centered keyboard 215. In other embodiments, video layer 216 may be used to display an instructional video, or other video or images with which the user can interact using centered keyboard 215. In further embodiments, video layer 216 may be used to display musical notation, providing simultaneous viewing of the keyboard and notation and removing the necessity of a tactile keyboard for simultaneously navigating the instrument and notation. FIGS. 8A-8C illustrate some additional views of user interface 200c, and the interaction between centered keyboard 215 and video layer 216.

User interface 200c can include a presentation 217 of shapes layouts that is configured to reduce the amount of visual space used to present the shapes layouts as compared to the presentation of shape layout 100a in user interface 200b. As depicted, for example, presentation 217 can represent each shapes grouping as a box, icon, circle, or other designator. Presentation 217 can visually emphasize a suggested shapes grouping for the song or music video that is currently being presented. For example, FIG. 2C depicts that shapes grouping 218 is currently selected, or is suggested for use in connection with the music video being played at video layer 216.

In some embodiments, user interface 200c can visually indicate the shapes that are in a grouping. For example, when a shapes grouping is selected, a popup that presents the shapes corresponding to the selected shapes grouping may displayed. For example, FIG. 2C depicts that when shapes grouping 218 is selected, popup 219 is presented, showing the shapes that are part of shapes grouping 218. In other embodiments, when a shapes grouping is selected, keys of centered keyboard 215 that correspond to the selected shapes grouping are highlighted or otherwise visually distinguished from other keys of centered keyboard 215. In some embodiments, keys corresponding to each shape in the grouping are highlighted in a different color. In some embodiments, playing notes that are not part of the shape may result in a visual response, such as causing popup 219 to shake. In other embodiments, the tonal center or "Anchor Note" may also be indicated on popup 219.

Figure 2D:
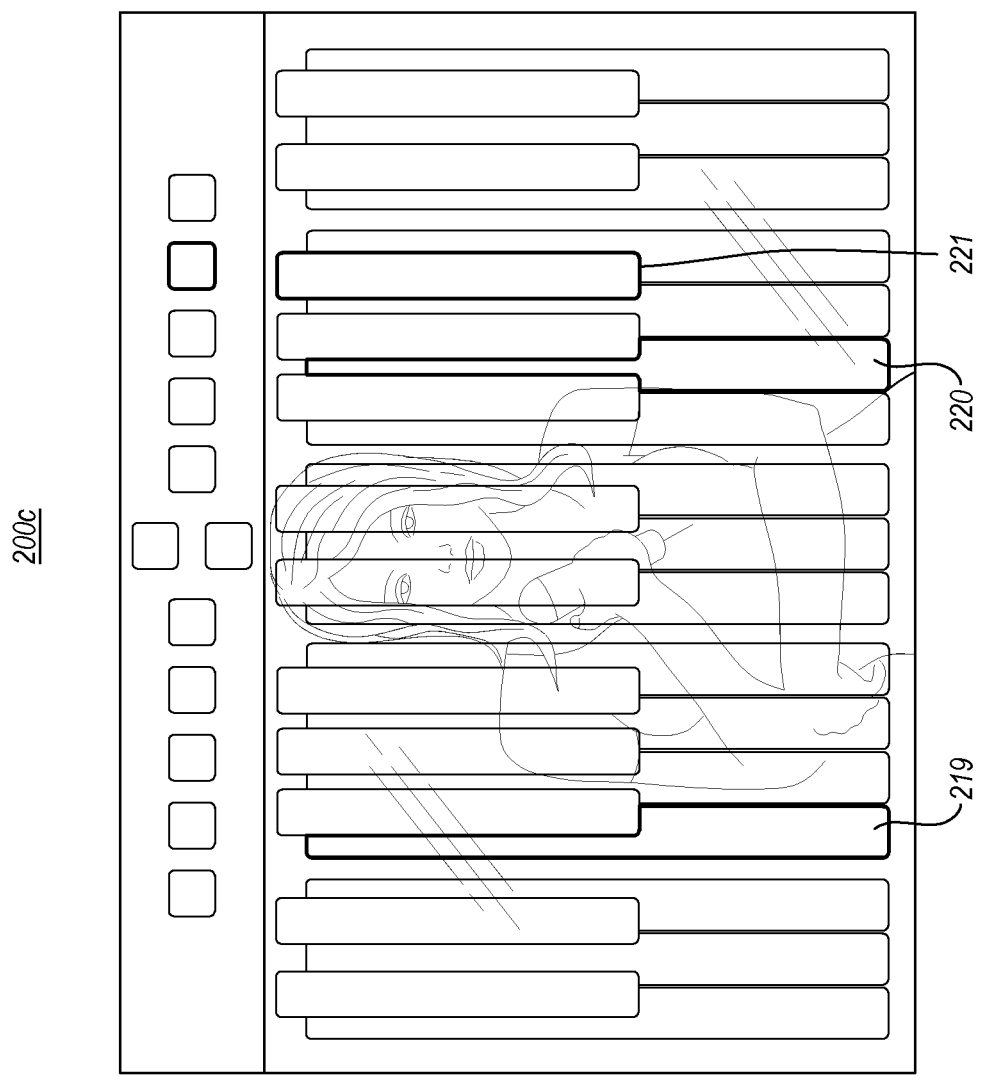
FIG. 2D illustrates one example of a virtual centered keyboard musical instrument and user interface.

In some embodiments, user interface 200c provides visual feedback of the keys that have been selected. For example, FIG. 2D depicts that keys that are currently being pressed (i.e., keys 219, 220, and 221) are visually highlighted.

When presenting centered keyboard 215, user interface 200c can optimize the size and shapes of the keys in a manner that increases user comfort when using a virtual musical instrument. For example, keys may be elongated relative to other virtual touchscreen keyboards, so that the vertical spacing is emphasized over the horizontal spacing, to improve playability rather than to retain the look of a standard physical keyboard. In some embodiments, the keys are lengthened such that, when displayed, the "lower" virtual keys are approximately the length of the average distance between the tip of the user's thumb and the tip of the user's middle finger. In some embodiments, the length of virtual keys may be customizable on a user-by-user basis.

Figure 7A:
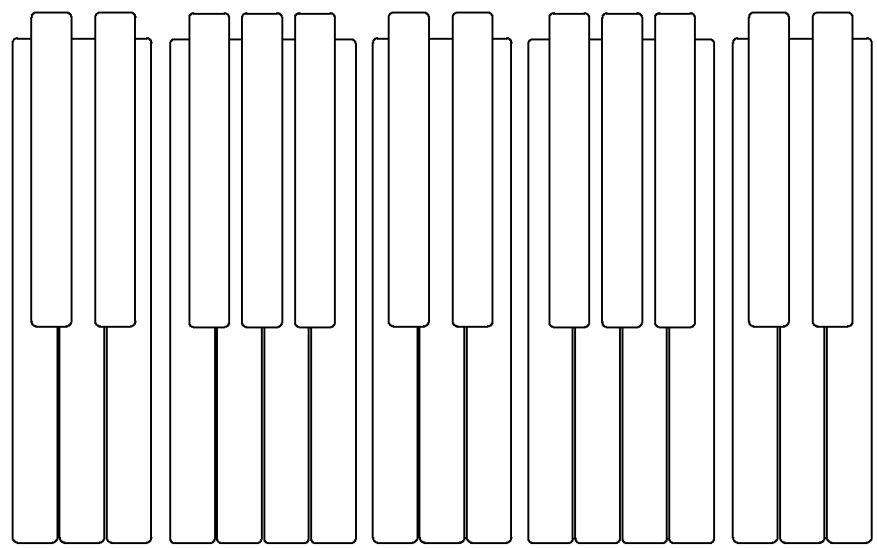
FIG. 7A illustrates some example virtual keys of a virtual centered keyboard musical instrument.
Figure 7B:
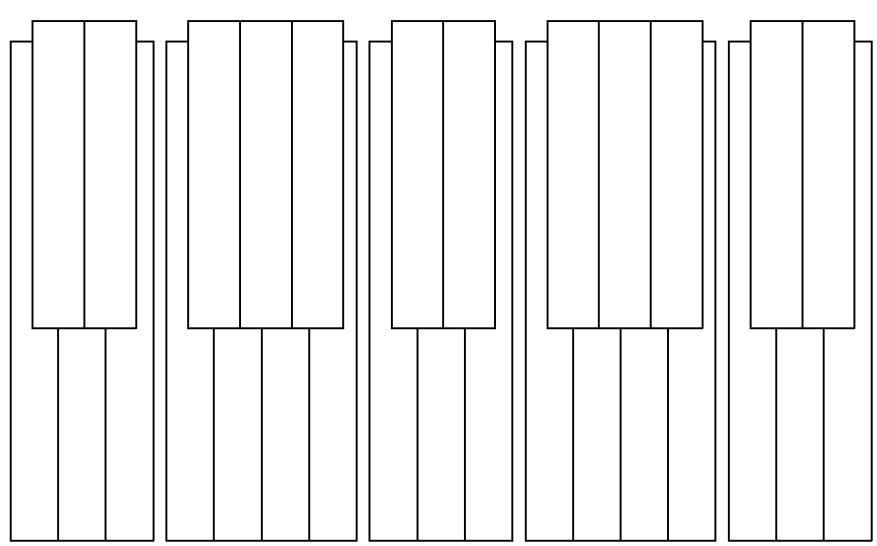
FIG. 7B illustrates some example control fields of a virtual centered keyboard musical instrument.

In some embodiments, when displaying a virtual centered keyboard, touch-sensitive control fields do not correspond to the virtual keys that are visually presented. For example, FIG. 7A illustrates the virtual keys of centered keyboard 215 as they are visually displayed, while FIG. 7B illustrates one embodiment of the control fields corresponding to the virtual keys of centered keyboard 215. As depicted, the control fields may de-emphasize spaces between the virtual keys, particularly with respect to the "top" virtual keys. In some embodiments spaces between the virtual keys of the same shape are de-emphasized (visually and/or with control fields), while preserving some emphasis of spaces between keys of different shapes. De-emphasizing spaces between the virtual keys of the same shape allows a user to slide between notes of the shape, without triggering unintended notes outside of the shape. In some embodiments, control fields may change configuration in real time to accommodate changing shapes, or in response to a user's gestures.

As indicated previously, shapes can be used for musical learning and interaction. The musical learning and interaction described herein may be used in connection with the musical instruments also disclosed herein, such as centered keyboard 200a, centered keyboard 214, or centered keyboard 215, but the musical learning and interaction described herein may be used in connection with a variety of musical instruments, or may be applied to the teaching of traditional musical concepts (e.g., key signatures, scales, chord names, staff notation, and the like).

Musical learning can comprise music lessons or games which familiarize a student with shapes, and which use shapes to help the student become intuitively familiar with both an instrument and the tonal contexts of music being played on the instrument. Following is an example series of music lessons, according to one or more embodiments. Although the example series of music lessons are presented in a particular order, it will be appreciated that these lessons may be presented in a variety of orders. The example music lessons may take the form of lessons presented by an instructor, through a book, using a computer system, etc. The example music lessons may guide students using a series of instructional prompts (e.g., verbal and/or written). It will be appreciated that music lessons which leverage shapes can take a variety of forms, and are not limited to the following example series of music lessons.

A first example music lesson uses shapes to enable students to begin playing along with music, no matter the students' existing skill level or familiarity with music. Using visual or auditory prompts, the first music lesson educates students about shapes generally. For example, one or more prompts can instruct students that humans hear music, no matter the style, in terms of some common groups of notes. These notes form shapes on the keyboard. Just about every song fits with a pair of shapes. Shapes are made of lines on the keyboard that connect several keys into a single, recognizable "stroke."

The first example music lesson may present students with a visual indication of one or more shape layouts, such as the layouts presented in FIGS. 1A and 1B. The first music lesson also may present students with a particular pair of shapes that fits with a particular song (e.g., by visually distinguishing the pair from other shapes, by presenting the pair singly, etc.). Using one or more prompts, the first music lesson informs students that when a pair of shapes fits with a song, any of the notes in the pair will sound good with the song, no matter the order in which they are played and no matter where on the keyboard the notes appear. The first music lesson prompts students to play notes in the particular pair of shapes (in any order and anywhere on the keyboard) while the particular song is played. The first music lesson may also prompt students to play notes from shapes not in the particular pair of shapes to demonstrate how these notes do not fit as well with the song.

As such, the first example music lesson familiarizes students with shapes, and begins to get students comfortable with playing along with music using notes selected from a single pair of shapes.

A second example music lesson introduces students to the broader range of shapes and the notes that accompany them. During the second music lesson, one or more prompts instruct students that, when using shape layout 100a, shapes making a pair are next to each other in the layout. The prompts can also identify pairs. For example, one or more prompts may identify the middle pair (shapes 104 and 111), the pairs to the left of middle (comprising shapes 102, 103, 108, 109, and 110, as previously described in connection with FIG. 1A) the pairs to the right of middle (comprising shapes 105, 106, 112, 113, and 114, as previously described in connection with FIG. 1A), and the pair that repeats at the end of the group (shapes 101 and 107).

In some embodiments, the second music lesson is presented at a computer system, and selection by a student of two shapes that make a pair can result in presentation of a playlist of songs that fits with the selected pair. Then, upon selection by the student of a song from the playlist, the song is played by the computer system and the student is prompted to play along with the song using notes in the selected pair (again, in any order and using keys anywhere on the keyboard that are in the pair).

A third example music lesson introduces students to naming conventions associated with the shapes. During course of the third music lesson, one or more prompts instruct students that each pair is named by (i) its number of "top" keys and (ii) whether the pair is to the left or right side of center. For example, one or more prompts may present students with shapes 103 and 109 and inform them that because the pair has three top keys and is on the left, the pair is called "Three to the Left." In another example, one or more prompts may present students with shapes 106 and 113 and inform them that while the pair also has three top keys it is on the right, so it is called "Three to the Right." One or more prompts can instruct students about all or part of the other shapes previously described. Once students are familiar with the names of the pairs, students can associate songs with the name of a pair that matches the songs. As such, the third example music lesson enables students to identify shapes by their names, further helping them to memorize the shapes and to solidify their confidence in playing shapes with music.

A fourth example music lesson guides students through matching a song with its shapes on their own. Being able to do so enables students to play with any songs that they hear, without first being informed which shapes to use. One or more prompts can inform students that they match a song with its shapes by comparing different shapes to the song in order to determine which shapes fit best. A trick is to remember that shapes that sound alike are close to each other in the layout, and shapes that sound different are farther apart.

The prompts may ask students to choose a shape (it doesn't matter which one) from the bottom row and to play notes from that shape along with the beat of the song. The prompts may inform them that if the chosen shape doesn't sound very good, they can choose a different shape. If the chosen shape seems far off, they should try a new shape that is far away from the previous shape in the layout. Conversely, if the chosen shape seems close, they should try a new shape that is close to the previous shape in the layout. When choosing shapes, students do not have be sure about every single note, but should instead listen to the shape as a whole to hear if the match is getting closer or further off. Once students find a shape that fits, the second shape in the pair is right above it in the layout. Sometimes there is only one choice for the second shape, but in most cases there are two, and students need only try each choice to hear which fits best.

In some embodiments of the fourth music lesson, the prompts guide students through matching a shape to a particular song. For example, the fourth music lesson may give students a particular shape to try first, and then suggest shapes to try along the way until a matching pair is found. The fourth music lesson encourages students to recognize tonal contexts actively. As such, students gain interest in music as they are able to play along with songs they are interested in without first being informed which shapes to play with the song.

A fifth example music lesson encourages students to deepen their understanding of and interaction with music through recognition of the tonal center, called the "anchor note". One or more prompts inform students that there is one particular note—the anchor note—that all the other notes in a shape seem to pull toward. As the other notes move away from the anchor note the notes take on a feeling of tension (or pull), and when the notes arrive back to the anchor note the tension goes away. The prompts can present students with a particular song and its anchor note, and demonstrate the anchor. For example, the prompts may play the notes of a shape, and pause each time the anchor note is played. Doing so demonstrates that all the other notes seem to pull toward the anchor note. The prompts can also highlight that, when playing random notes of the shape followed by the anchor note, each note sounds like it is pulling toward the anchor.

A sixth example music lesson builds on the fifth music lesson, and teaches students how to use the anchor note when playing along with songs. One or more prompts inform students that they can use the anchor note to come up with some great sounding ideas in their playing. For example, they may try (i) playing the anchor note with the beat of the song; (ii) playing the anchor note while alternating it with any other note of the shape, but always coming back to the anchor note; (iii) playing every other note of the shape starting on the anchor note (resulting in a common chord structure); (iv) playing any one or more notes of the shape with the right hand and the anchor note with the left hand at the same time, (v) playing a structure with the right hand and moving from the anchor note to different notes of the shape with the left hand, (vi) deciphering the melody, etc.

A seventh example music lesson teaches students how to find the anchor note on their own. One or more prompts inform students that the anchor note can be any note of the shape, so two songs that fit with the same shape can have completely different anchor notes. The prompts can guide students through finding anchor notes in different songs. For each song, the prompts can instruct students to play the notes of a shape while listening for the anchor note. If a student has trouble hearing the anchor note, the student can be prompted to repeat each note slowly with the beat and listen for whether or not it has a feeling of tension. The prompts can inform students of whether or not they have correctly chosen each anchor note. Teaching students to become more aware of anchor notes focuses the way they listen to music and also focuses the music they play.

An example eighth music lesson teaches students how to recognize songs that have changing shapes and anchor notes. One or more prompts inform students that some songs change from one shape to another and that some songs change from one anchor to another within a shape. With practice, students can learn to follow these changes. One technique for matching shapes more quickly is to begin by playing any note at random. Then, if the chosen note does not fit the song, the student can play the note immediately next to the previous note and listen for a fit. This process of comparing adjacent notes is repeated until the student has matched enough notes to determine the shape.

Embodiments of the present invention also include methods, systems, and computer program products that build on shapes-oriented music lessons to enable students to further interact with music. For example, embodiments include a remix application that enables a user to mix one or more user-recorded audio tracks with existing songs. Such applications can include multi-track versions of songs and/or virtual instruments (e.g., sample-based instruments derived from those songs). Remix applications according to embodiments herein can identify a pair of shapes that matches a song, prompt a user to record one or more audio tracks using those shapes while playing the song, and remix the recorded track(s) with the song.

Figure 3:
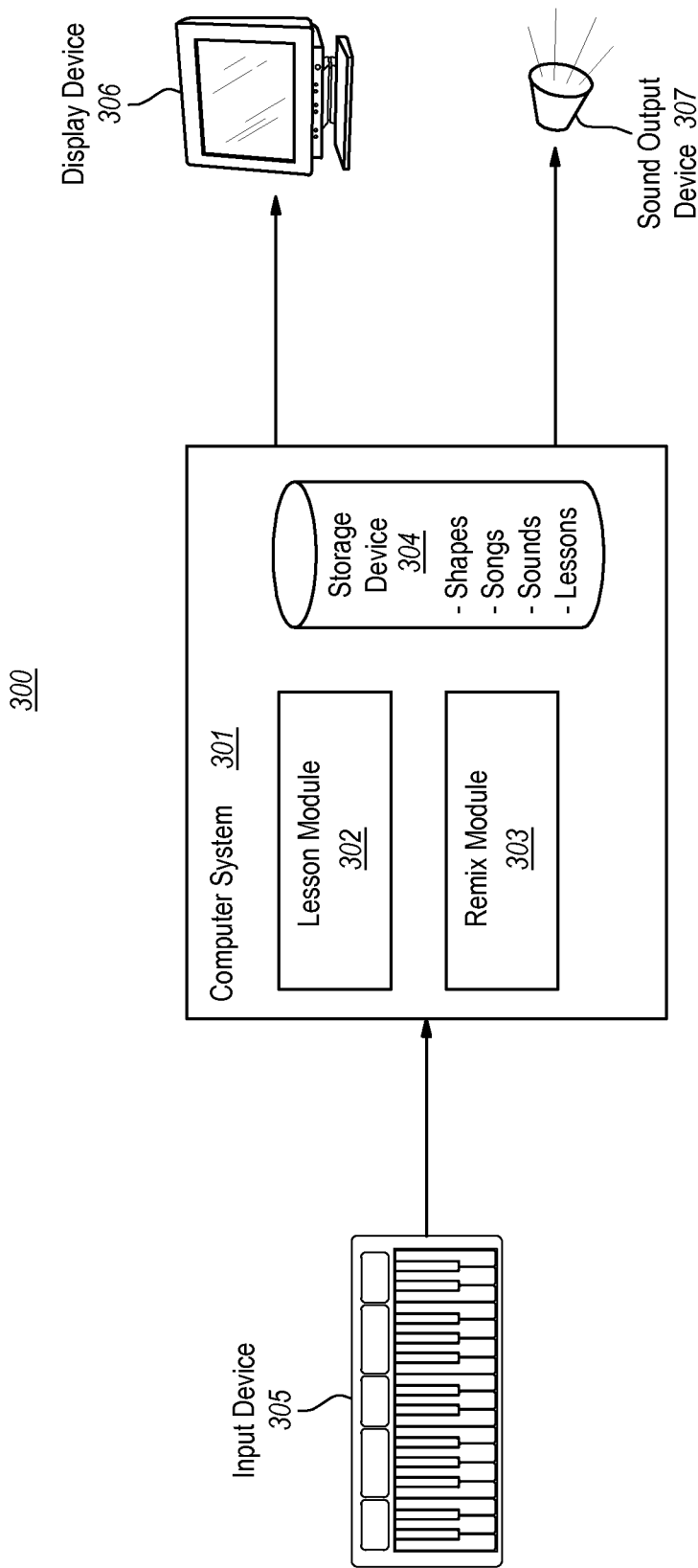
FIG. 3 illustrates an example computer architecture that facilitates musical learning and interaction through shapes.

FIG. 3 illustrates an example computer architecture 300 that facilitates musical learning and interaction through shapes. Referring to FIG. 3, computer architecture 300 includes computer system 301, input device 305, display device 306, and sound output device 307. Each of the depicted components can be part of an integrated computer system, or can be remotely connected through appropriate wired or wireless communications mechanisms. Computer architecture 300 can represent various types of computer systems, such as a general purpose computer system (e.g., a desktop or a laptop computer), a gaming console, a mobile device (e.g., a mobile telephone, a mobile media device, a tablet computer, etc.), or any other appropriate type of computer system.

Computer system 301 includes modules, components, and/or devices that are configured to facilitate musical learning and interaction through shapes. As depicted, for example, computer system 301 includes lesson module 302, remix module 303, and storage device 304.

Lesson module 302 is configured to present one or more music lessons using shapes. For example, lesson module 302 may be configured to present any combination of the eight music lessons described above, or any other music lesson involving shapes. In some embodiments, lesson module 302 presents music lessons in an instructive manner. In some embodiments, lesson module 302 presents music lessons as one or more games. When presenting music lessons as a game, lesson module 302 may score users on their ability to identify shapes belonging to a song, their ability to identify an anchor note, their ability to correctly play notes belonging to a shape, their ability to switch shapes and/or anchor notes with shifting tonalities of songs, their ability to remember which shapes belong to a song, etc.

In some embodiments, lesson module 302 is configured to maintain a database containing information to cross-reference song file information (e.g., artist, time, title) with shapes and anchors. For example, lesson module 302 may maintain a database in storage device 304, or at any other appropriate storage location (e.g., at a database accessible through the Internet). In some embodiments, lesson module 302 may also be configured to analyze audio data or files in order to determine the shape automatically.

In some embodiments, lesson module 302 is configured to track user history and progress. For example, lesson module 302 may track rhythmic accuracy, duration of playing time, attempts by a user to identify key groupings that fit with songs, attempts by users to identify anchor notes, etc. Lesson module 302 can be configured to store tracked history in storage device 304 and to generate reporting data at display device 306.

Remix module 303 is configured to present one or more remix user interfaces to users. For example, remix module 303 may present a song along with one or more shapes matching the song. Then, remix module 303 may play one or more tracks of the song at sound output device 307 while recording one or more user tracks as the user plays notes from the shape(s) matching the song. Remix module 303 can then combine one or more original tracks of the song with one or more user-recorded tracks of the song. In some embodiments, remix module 303 uses notes that are sampled from the original song. In some embodiments, remix module 303 records and mixes user-recorded tracks from a plurality of instruments.

Storage device 304 is configured to store any information appropriate for operation of lesson module 302 and/or remix module 303. For example, storage device 304 may store information about shapes, such as shape layouts, images of shapes, shape names, or other shape-related data. Storage device 304 may also store songs (in single-track and/or multi-track forms) for use with lesson module 302 and/or remix module 303. Storage device 304 may also store a mapping between songs and matching shapes (or pairs of shapes). Storage device 204 may also store a mapping of anchor notes to songs. Storage device 304 may also store sampled note data, such as notes that are sampled from songs, for use with user-recorded notes. For example, sampled note data can be used to provide audio for notes received from a MIDI instrument. Storage device 304 may also store lesson data, which is used by lesson module 302 for presentation of music lessons. For example, lesson data may include prompts used by lesson module 302, the identity of songs to use as part of lessons, the identity of shapes to use as part of lessons, etc. Storage device 304 can store any other appropriate data.

While storage device 304 is depicted as being part of computer system 301, storage device 304 may additionally or alternatively be remotely located, such as on a local area network, wide area network, or even the Internet. In some embodiments, storage device 304 is accessible by many computer systems (e.g., in embodiments when storage device 304 is accessible over the Internet), and stores aggregate information pertaining to a plurality of users. For example, storage device 304 may maintain playlists, re-mixed songs, etc. for a plurality of users.

Input device 305 comprises any physical or virtual input device for use with user interfaces generated by lesson module 302 and/or remix module 303. For example, input device 305 may comprise a MIDI keyboard, an electronic guitar, or any other musical device which interfaces with a computer system. As depicted, input device 305 may comprise a centered keyboard which is the same as or similar to centered keyboard 200a of FIG. 2A. Input device 305 may also comprise a virtual device displayed at a display device, such as virtual centered keyboard 214 of FIG. 2B or virtual centered keyboard 215 of FIGS. 2C and 2D. In some embodiments, input device 305 comprises a general purpose instrument, while in other embodiments input device 305 comprises a special purpose device created for use with computer system 301, such as a gaming controller.

Display device 306 comprises one or more computer displays which present user interfaces generated by lesson module 302 and/or remix module 303, and which may present virtual instruments. In some embodiments, display device 306 comprises a computer monitor. In some embodiments, display device 306 comprises a television. In some embodiments, display device 306 comprises an integrated display, such as a display on a mobile telephone, a mobile media device, or a tablet computer. In some embodiments, display device 306 is touch sensitive, such that display device and input device 305 are integrated. In some embodiments, a first display device presents a user interface (e.g., a game, a lesson, etc.), while a second display device presents a virtual instrument.

Sound output device 307 comprises one or more audio devices capable of producing sound from signals generated by computer system 301. In general, sound output device 307 comprises one or more speakers. Sound output device 307 can be used to play songs while receiving user input, to play notes based on received user input, and/or to play remixed songs. When playing notes based on received user input, sound output device 307 may play notes based on sample-based instruments derived from a song being played.

Figure 4:
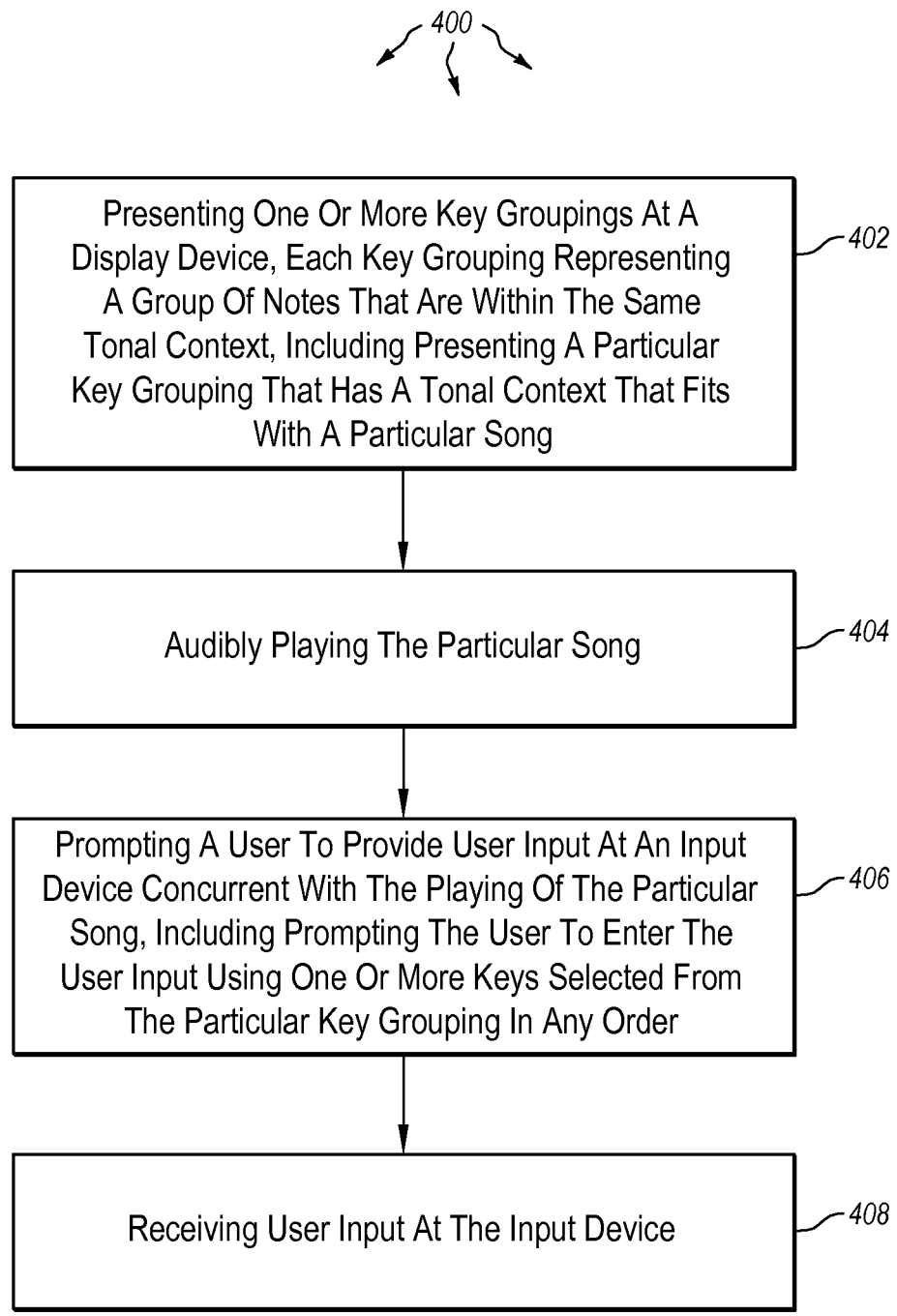
FIG. 4 illustrates a flow chart of an example method for presenting a music lesson.

FIG. 4 illustrates a flow chart of an example method 400 for presenting a music lesson. Method 400 will be described with respect to the shapes presented in FIGS. 1A and 1B, the musical instruments presented in FIGS. 2A-2D, and the components and data of computer architecture 300.

Method 400 includes an act of presenting one or more key groupings at a display device, each key grouping representing a group of notes that are within the same tonal context, including presenting a particular key grouping that has a tonal context that fits with a particular song (act 402). For example, lesson module 302 can present an instructional or gaming user interface at display device 306. The user interface can present shapes representing key groupings that have the same tonal context. In particular, the user interface can present one or more shapes that match a particular song stored in storage device 304, or that is otherwise available to computer system 301 (e.g., over the Internet). For example, the user interface can present an entire shape layout as shown in FIGS. 1A and 1B and visually or audibly distinguish shapes matching the particular song, or a portion of a layout (e.g., a pair of shapes matching the particular song).

Method 400 also includes an act of audibly playing the particular song (act 404). For example, computer system 301 can play the particular song at sound output device 307.

Method 400 also includes an act of prompting a user to provide user input at an input device concurrent with the playing of the particular song, including prompting the user to enter the user input using one or more keys selected from the particular key grouping in any order (act 406). For example, lesson module 302 can prompt the user to provide user input at input device 305. In particular, lesson module 302 can prompt the user to provide user input using keys from one or more shapes (e.g., a pair of shapes) that match the song being played (or to be played) at sound output device 307. For example, lesson module 302 can prompt the user to enter user input at a centered keyboard, such as physical centered keyboard 200a of FIG. 2A, virtual centered keyboard 214 of FIG. 2B, virtual centered keyboard 215 of FIGS. 2C and 2D.

Method 400 also includes an act of receiving user input at the input device (act 408). For example, input device 305 can receive user input concurrent with the particular song being played at sound output device 307.

Figure 5:
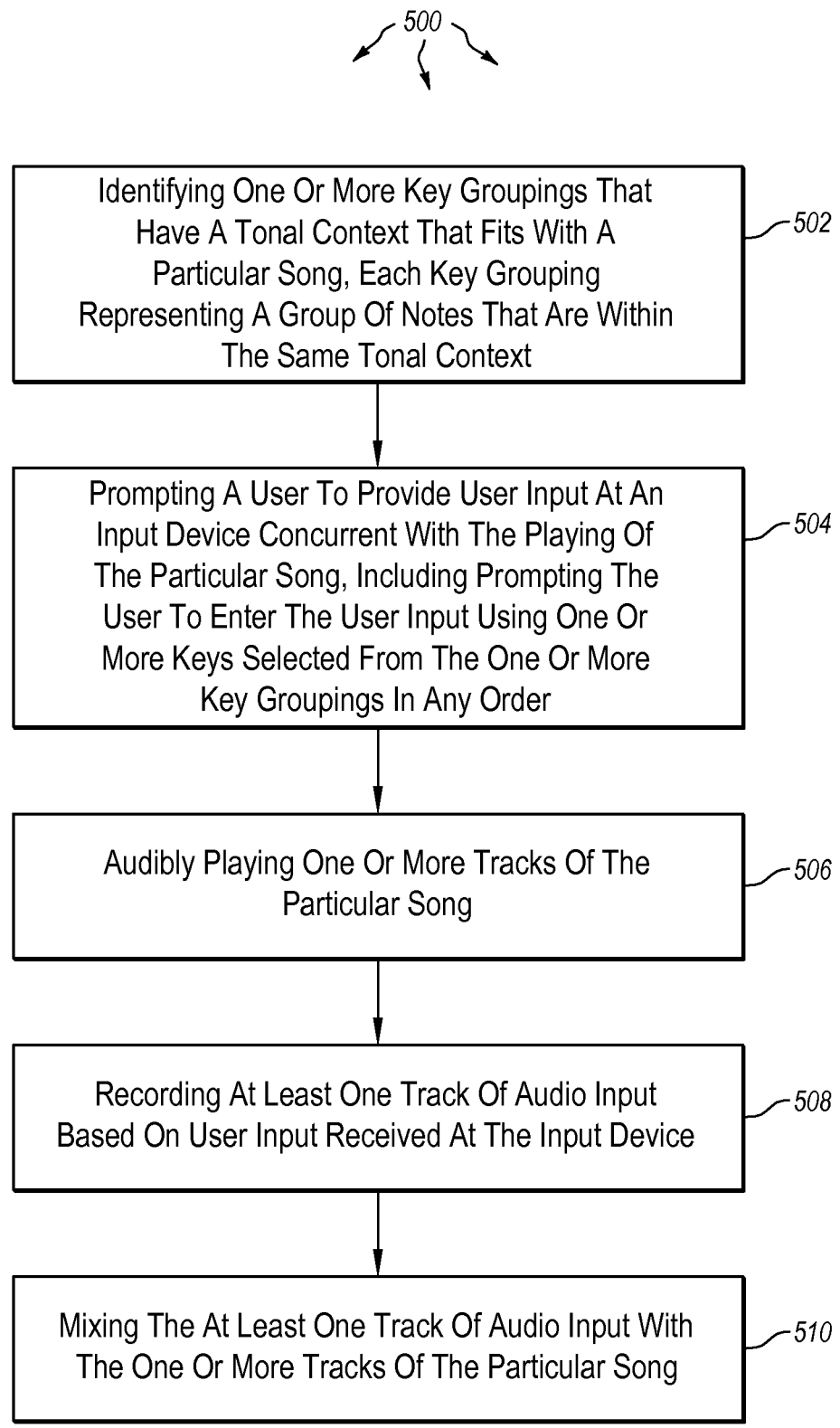
FIG. 5 illustrates a flow chart of an example method for remixing music.

FIG. 5 illustrates a flow chart of an example method 500 for remixing music. Method 500 will be described with respect to the shapes presented in FIGS. 1A and 1B, the musical instruments presented in FIGS. 2A-2D, and the components and data of computer architecture 300.

Method 500 includes an act of identifying one or more key groupings that have a tonal context that fits with a particular song, each key grouping representing a group of notes that are within the same tonal context (act 502). For example, remix module 303 can identify that one or more shapes (e.g., a pair of shapes) matches with a song that is stored in storage device 304 or that is otherwise available to computer system 301 (e.g., over the Internet). For example, remix module 303 can consult mapping data stored in storage device 304, or analyze audio data or files in order to determine the shape automatically.

Method 500 also includes an act of prompting a user to provide user input at an input device concurrent with the playing of the particular song, including prompting the user to enter the user input using one or more keys selected from the one or more key groupings in any order (act 504). For example, remix module 303 can prompt the user to provide user input at input device 305. In particular, remix module 303 can prompt the user to provide user input using keys from one or more shapes (e.g., a pair of shapes) identified in act 502. In some embodiments, remix module 303 prompts the user to enter user input at a centered keyboard, such as physical centered keyboard 200a of FIG. 2A, virtual centered keyboard 214 of FIG. 2B, or virtual centered keyboard 215 of FIGS. 2C-2D.

Method 500 also includes an act of audibly playing one or more tracks of the particular song (act 506). For example, computer system 301 can play one or more tracks of the particular song at sound output device 307.

Method 500 also includes an act of recording at least one track of audio input based on user input received at the input device (act 508). For example, while the particular song is being played at sound output device 307, remix module 303 can record user input entered at input device 305 into one or more user-recorded tracks. In some embodiments, remix module 303 records user input received at a plurality of user input devices into the same track or into different tracks.

Method 500 also includes an act of mixing the at least one track of audio input with the one or more tracks of the particular song (act 510). For example, remix module 303 can combine one or more user-recorded tracks with one or more tracks of the particular song. Remix module 303 can then play the re-mixed song at sound output device 307, export or share the song electronically (e.g., post the song to a social networking site, e-mail the song, share the song over BLUETOOTH), store the re-mixed song for later use (e.g., at storage device 304), etc.

Accordingly, embodiments of the present invention enhance musical learning by encouraging students to become more active participants in the musical learning process. In particular, the shapes and instruments disclosed herein, and the manner in which those shapes and instruments are used, enable students to almost immediately engage in music and begin participating in the broader tonal contexts of music. Doing so holds students' interest, helps students to gain an intuitive feel for music, and establishes skills that will aid students in a more comprehensive study of music.

Additional lessons or applications may include one or more additional concepts that are built on the shapes and instruments disclosed herein. For example, one or more lessons or applications according to embodiments of the present invention may include tonescapes. Tonescapes are an ear-training device that enables users to further refine their skills for listening and for identifying musical contexts and structures. Tonescapes teach users to listen deeply inside sounds and to control what they hear. In doing so, tonescapes help users to build awareness of tonal contexts and tension relationships, to develop or refine independent (i.e., absolute) pitch perception, and to develop the ability to hear sounds internally.

Tonescapes comprise a grouping of pitches—such as all or some of the pitches that are defined by a shape—that are sounded simultaneously for an extended period of time. Generally, all pitches are sounded at the same volume level. In some embodiments, a tonescape spans from one octave below the center of the keyboard to one octave above. A tonescape may emphasize the anchor note by placing it both as the lowest note and the highest note. In some embodiments, tonescapes are bounded by a common pitch as the lowest, the highest, and/or the loudest to convey a tonal center. In some embodiments, tonescapes are bounded by a common range of pitches to avoid conveying a tonal center. Tonescapes may begin with a fade-in, or with notes sounding one-by-one (e.g., in order from lowest to highest). Tonescapes may end with a fade-out, or with notes ceasing one-by-one.

One or more lessons or applications according to embodiments of the present invention may also include shape notation. Shape notation is a device or system for representing musical structures and their tonal context(s). Shape notation is a relative notation system that conveys the structure of standard notation through an understanding of shapes. FIG. 6 illustrates an example shape notation 600, according to one or more embodiments of the invention. As depicted, shape notation 600 contains a plurality of evenly-distributed staff lines and spaces (e.g., the depicted lines and spaces 602a, 602b) and indicates a shape, graphically or textually (e.g., the depicted shape 604). The notes of the shape correspond to the staff lines and spaces. In some embodiments, shape notation indicates the anchor note (or tonal center) graphically or textually (e.g., the depicted arrow 606). In some embodiments, shape notation 600 indicates the staff line or space which corresponds to the anchor note indicated (e.g., the depicted arrows 608a and 608b). As depicted, shape notation 600 may include dots or some other designator spaced horizontally across the staff. These dots/designators may correspond to one or both of time values or note spacing. In some embodiments, shape notation 600 uses a relative accidental system, which indicates graphically if a note moves "up" (higher in pitch) or "down" (lower in pitch) outside the indicated shape, or if it returns to the context of the shape. Shape notation 600 makes it possible to begin writing and reading music with no more than a simple understanding of shapes and anchors. Additional lessons or applications may teach standard notation through the gradual incorporation of standard musical symbols into shape notation 600.

One or more lessons or applications according to embodiments of the present invention may also use the mood spectrum. The mood spectrum is a device for organizing and navigating tonal tension relationships. When an anchor note is established within a shape, the entire shape takes on a distinct musical feeling or "mood." The mood spectrum arranges these moods on a scale of "lighter" to "heavier" musical tension, and corresponds to the structure of groups of shapes. Users can thus identify a mood solely according to its position within the mood spectrum, and without referencing any other particular mood. Furthermore, the mood spectrum aligns the structure of the first and second groups of shapes, allowing users to navigate the moods of both groups in parallel.

One or more lessons or applications according to embodiments of the present invention may also include shape fingerings. Shape fingerings are a device for representing shapes tactilly, and for developing keyboard tactile orientation. Shape fingerings do not intrinsically consider an anchor note, but instead are based on how the hand fits the keyboard. In accordance with shape fingerings, players arrange fingers that "stick up" (pointer, middle, and ring fingers) with keys that stick up (top keys) within a key grouping, and then move their fingers into each shape beginning from this position. Additionally, players may locate entire key groupings, such as key groupings 204-208 of FIG. 2A, based on the distance of these groupings to the axis of symmetry of a centered keyboard.

One or more lessons or applications according to embodiments of the present invention may also include independent solfege. Independent solfege is a purely absolute system for naming notes. Independent solfege gives each pitch a consistent, independent name not derived from or referencing any other note, and not inherently implying or referencing any tonal context. It allows context to be conveyed through shapes only when necessary, has no enharmonic spellings, and gives equal emphasis to the absolute quality of each pitch. An example version of independent solfege adds five new syllables to the existing seven-note fixed solfege system. The twelve example syllables are (in chromatic order): Re, Na, Mi, Fa, Ve, So, Pe, La, Ke, Ti, Do, and Ba. Independent solfege may be paired with a purely relative naming system (e.g., numbers) to teach context-based naming choices in the standard naming system.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, gaming consoles, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors, system memory and display having one or more display fields, a method for presenting a musical instrument at a user interface, the method comprising:
   displaying a video layer, the video layer being configured to visually present one or more video frames of a video; and
   displaying a virtual musical instrument, the virtual musical instrument being overlaid over a least a portion of the video layer, the virtual musical instrument being at least partially transparent, such that the portion of the video layer over which the virtual musical instrument is overlaid shows through the virtual musical instrument, the virtual musical instrument being playable by a user, wherein at least a portion of the virtual musical instrument and the video layer are displayed within the same display field.

2. The method as recited in claim 1, further comprising:
   displaying a presentation of shapes layouts, including a plurality of designators that each correspond to a different shapes grouping, wherein each shapes layout comprises a unique visually perceptible graphic that corresponds to one or more note groupings within a same tonal context.

3. The method as recited in claim 2, wherein selection of a particular designator on the presentation of shapes layouts presents a popup that illustrates a corresponding shapes grouping.

4. The method as recited in claim 2, wherein selection of a particular designator on the presentation of shapes layouts presents a popup that highlights fingering of a virtual musical instrument that correspond to a corresponding shapes grouping.

5. The method as recited in claim 1, wherein the virtual musical instrument comprises at least the portion of the virtual musical instrument used for playing.

6. The method as recited in claim 5, wherein the portion of the virtual musical instrument used for playing is elongated to improve playability.

7. The method as recited in claim 5, wherein the portion of the virtual musical instrument used for playing is visually separated by shape.

8. The method as recited in claim 5, wherein one or more control fields of the virtual musical instrument are larger than a visual size of one or more corresponding playable portions of the virtual musical instrument.

9. The method as recited in claim 8, wherein one or more control fields of the virtual musical instrument are configured to de-emphasize spaces between the playable portions of the virtual musical instrument.

10. The method as recited in claim 1, further comprising:
    presenting audio synchronized to the video.

11. A computer program product comprising one or more physical storage devices having stored thereon computer-executable instructions that, when executed by one or more processors of a computer system, cause the computer system to present a musical instrument at a user interface, including the following:
    displaying a video layer, the video layer being configured to visually present one or more video frames of a video on a display having one or more display fields; and displaying a virtual musical instrument, the virtual musical instrument being overlaid over at least a portion of the video layer, the virtual musical instrument being at least partially transparent, such that the portion of the video layer over which the virtual musical instrument is overlaid shows through the virtual musical instrument, the virtual musical instrument being playable by a user, wherein at least a portion of the virtual musical instrument and the video layer are displayed within the same display field.

12. The computer program product as recited in claim 11, further comprising:
displaying a presentation of shapes layouts, including a plurality of designators that each correspond to a different shapes grouping, wherein each shapes layout comprises a unique visually perceptible graphic that corresponds to one or more note or tonal groupings within a same tonal context.

13. The computer program product as recited in claim 12, wherein selection of a particular designator on the presentation of shapes layouts presents a window that illustrates a corresponding shapes grouping.

14. The computer program product as recited in claim 12, wherein selection of a particular designator on the presentation of shapes layouts presents a window that highlights a playable portion of a virtual musical instrument that correspond to a corresponding shapes grouping.

15. The computer program product as recited in claim 11, wherein the virtual musical instrument comprises a portion of the virtual musical instrument that is playable.

16. The computer program product as recited in claim 15, wherein one or more playable portions of the virtual musical instrument are elongated relative to the portion of a physical musical instrument.

17. The computer program product as recited in claim 15, wherein one or more playable portions of the virtual musical instrument are visually separated by shape.

18. The computer program product as recited in claim 15, wherein one or more control fields of the playable portion of the virtual musical instrument are larger than a visual size of one or more corresponding playable portions.

19. The computer program product as recited in claim 18, wherein one or more control fields of the virtual musical instrument are configured to de-emphasize spaces between the playable portions of the virtual musical instrument.

20. A computer system, comprising:
one or more processors; and
one or more computer readable media having stored thereon computer-executable instructions that, when executed on the one or more processors, implement a method for presenting a playable portion of a virtual musical instrument at a user interface, including the following:
displaying a video layer, the video layer being configured to visually present one or more video frames of a video on a display having one or more display fields;
displaying a playable portion of a virtual musical instrument, the playable portion of the virtual musical instrument being overlaid over at least a portion of the video layer, the playable portion of the virtual musical instrument being at least partially transparent, such that the portion of the video layer over which the playable portion of the virtual musical instrument is overlaid shows through the virtual musical instrument, the virtual musical instrument being playable by a user, wherein at least a portion of the playable portion of the virtual musical instrument and the video layer are displayed within the same display field; and
displaying a presentation of shapes layouts, including a plurality of designators that each correspond to a different shapes grouping, wherein selection of a particular designator on the presentation of shapes layouts presents a portion that highlights playable portions of the virtual musical instrument that correspond to a corresponding shapes grouping.

\* \* \* \* \*